Oct. 22, 1957 W. NEUGEBAUER ET AL 2,810,341

REPRODUCTION IN FLAT AND OFFSET PRINTING

Original Filed Jan. 13, 1949

INVENTORS
WILHELM NEUGEBAUER
JAKOB BARTHENHEIER
BY Karl Huber,
Milton C. Gilbert
ATTORNEYS United States Patent Office 2,810,341

Patented Oct. 22, 1957

2,810,341

REPRODUCTION IN FLAT AND OFFSET PRINTING

Wilhelm Neugebauer, Wiesbaden-Biebrich, and Jakob Barthenheier, Eddersheim (Main), Germany, assignors, by mesne assignments, to Azoplate Corporation, Summit, N. J., a corporation of New Jersey Original application January 13, 1949, Serial No. 70,804. Divided and this application March 2, 1956, Serial No. 569,031

6 Claims. (Cl. 101—149.2)

Figure 1:
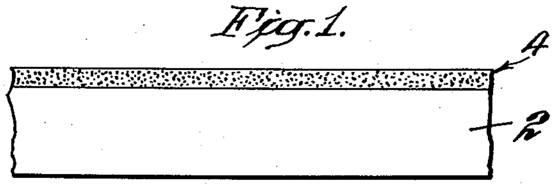
Figure 2:
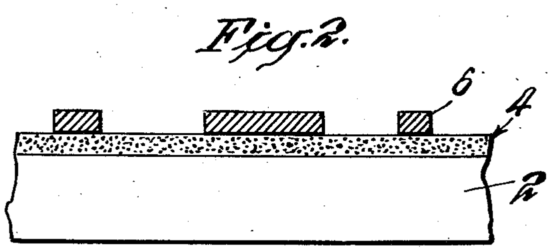
Figure 3:
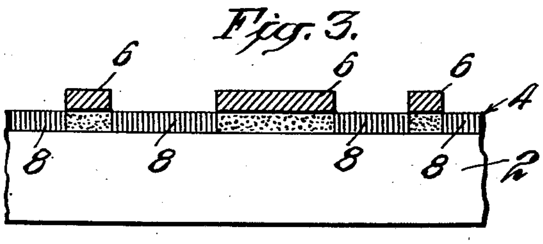
Figure 4:
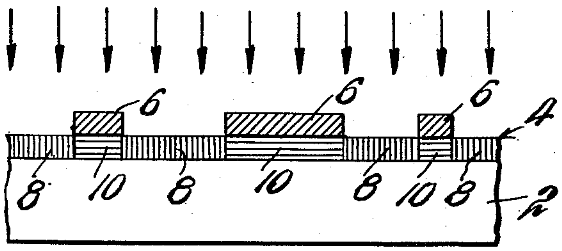

This invention relates to the production of photo-lithographic printing foils and is particularly concerned with producing printing plates from foils which have been made photo-sensitive with the aid of diazo compounds. More particularly, the invention relates to a new method of printing by means of photo-lithographic material which method does not rely on transferring the image photographically to the light sensitive base.

Foils having a hydrophilic surface photo-sensitized by means of diazo compounds have already been proposed for use in flat and offset printing. An effective method consists in producing a layer of regenerated cellulose on cellulose ester-foils, e. g. by superficially saponifying the ester-foil, applying a photo-sensitizing solution containing suitable diazo compounds to the cellulose layer and finally exposing the light sensitive foil to light under an original, thereby transforming the diazo compound at all places where it is not covered by the original (and therefore influenced by light) into a decomposition product having ready acceptance for fatty inks. At all places which were protected from direct exposure to light, the foil preserves its hydrophilic property and repels fatty ink. Thus positive prints are obtained, if negative originals are used. This known process is a photochemical one.

One object of our present invention is to provide a process of reproduction in flat and offset printing which uses as a starting material foils of the above described kind, i. e. foils having hydrophilic, nonmetallic surfaces and light sensitive layers containing diazo compounds as sensitizing agent, and transforms this foil into a positive printing plate without a photographic printing step.

The process of our invention is carried out by mechanically transferring the image which is to be reproduced onto the sensitized foil, e. g. by printing, writing or drawing.

At all places where it was not protected by the transferred image the diazo compound is then transformed into a hydrophilic reaction product which is no longer light sensitive and will no longer couple with azo components. Finally the diazo compound covered by the transferred image is decomposed by exposure to light into a product which will accept fatty ink when wet. It is to be understood that the latter exposure to light is carried out without the interposition of an original.

The abovementioned objects of the invention and method of its attainment will be more fully understood by the following description taken in connection with the drawing in which:

Figure I is a view in diagrammatic elevation showing the base material having a hydrophilic surface photo-sensitized by means of a diazo compound.

Figure II is a view in diagrammatic elevation showing the base material as in Figure I but with an image mechanically applied thereto.

Figure III is a view in diagrammatic elevation showing the base material having a mechanically transferred image applied thereto as in Figure II and having the areas of the photo-sensitized surface not protected by the mechanically transferred image transformed into a hydrophilic azo dyestuff by the application of an azo component to the article of Figure II.

Figure IV is a view in diagrammatic elevation showing the article of Figure III exposed to light to decompose the diazo compound underlying the mechanically transferred image into a printing ink receptive substance.

The basic material 2 shown in Figure I is provided with a hydrophilic surface 4 photo-sensitized with a diazo compound which on exposure to light will decompose into a fatty printing ink receptive substance. In Figure II, a mechanically transferred image 6 is applied to the hydrophilic photo-sensitized surface 4. The areas of the photo-sensitized surface not protected by the mechanically transferred image are then transformed into hydrophilic areas.

In order to produce the hydrophilic reaction product from the diazo compound, an azo component containing hydrophilic substituents may be applied to the surface and caused to couple with the diazo compound in the areas 8 of Figure III not protected by the mechanically transferred image 6 so as to form a hydrophilic azo dyestuff. Preferably fast coupling azo components are used.

The usual printing colors, lithographic inks and pencils can be used for transferring the image 6 onto the light sensitive foil by printing, writing or drawing. The deposition of the picture upon the foil can also be accomplished by means of a typewriter provided with the normal typewriter ribbons. The content of coloring matter in the printing ink is not of any importance, because the inks deposited upon the light sensitive foil for the purpose of producing the image in question has as its primary purpose the repelling of the solution of the azo component from all areas 6 of the foil appertaining to the image.

Hence it follows, that the ink used for producing the image 6 on the foil must not necessarily be colored. A printing substance or printing ink which in the course of the exposure does not absorb at all, or absorbs only weakly, the light which is actinic to the diazo compound has some advantage in certain cases, because the exposure can also be accomplished with good success from the front surface, whereas printing inks having high absorption for this actinic light make it desirable, if not necessary, to expose the foil to the light on its back surface. In this case the foil must have sufficient light transmissibility.

Foils or bases 2 which can be used for the new reproduction process are foils made of cellulose esters which are transformed to regenerated cellulose by means of saponification to a depth of about 10–20$\mu$. Foils produced from polyvinyl esters or similar saponifiable plastics and having saponified surfaces can also be used. A modification of the method consists in applying the esters or other saponifiable plastics in the form of a lacquer to a base, such as a sheet of metal or paper or the like, and superficially saponifying the lacquer coat.

Furthermore, it is possible to back the foils with sheets of metal, plastic material and other substances. This modification of the process is to be recommended, if the foils have been made of regenerated cellulose, which foils do not have a satisfactory dimensional stability under the operating conditions in flat-bed printing, i. e. in the presence of water, unless the foils have been backed with a non-swelling base.

The process of the present invention can also be applied to paper foils or bases. A paper sheet having a hydrophilic surface with a minimum of porosity is to be preferred. Thus, parchment paper foils offer distinct advantages. The paper base is preferably rendered water-proof according to known methods. This can be done by treating the paper with urea resins. Also paper foils having hydrophilic surface layers, which may be applied by means of a brush, can be used.

The expression "foils having a hydrophilic non-metallic surface" is believed to designate in the best manner all the abovementioned suitable base materials. Foils backed with sheet metal are intended to be included.

Any known diazo compound which upon exposure to light decomposes into a printing ink receptive substance may be used for producing the light sensitive layer, however it is preferable to use the diazo compounds of higher molecular weight corresponding to the general formula $$R—Y—Ar—N_2—X$$

wherein:

R=an aryl, aralkyl, a higher alkyl or an aroyl residue,
Y=O, S, NH, or $NR_1$; $R_1$ standing for alkyl, aralkyl or aryl,
Ar=an aromatic residue, and
X=an equivalent of an anion of an acid.

We understand the term "aroyl" to include in its scope the acyl radicals of aromatic carboxylic acids, e. g. benzoyl. The expression "equivalent of an anion of an acid" is intended to designate radicals such as $—Cl^-$, $SO_4^=$, $ZnCl_4^=—$, $—C_6H_5SO_3^-—$ and the like.

The substituent Y and the diazo group $N_2$ may preferably be in a para-position to each other. The aromatic residue Ar, the group R and the NH-group may contain further substituents. In most cases it is advantageous that the residues R and Ar are substituted by alkoxy, aroxy or N-aryl-sulfamido groups or by one or more halogen atoms. In the diazo compound of the formula

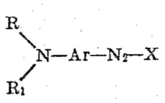

as above defined (i. e. where $Y=NR_1$) the substituents R and $R_1$ can be connected with one another to form a cyclic compound, or R or $R_1$ can be connected with Ar by a covalent linkage, but it is not desirable to have sulfo groups as substituents in any of R, $R_1$ and Ar.

The diazo compounds represented by the above formula, may be treated with an aldehyde, e. g. formaldehyde, to be transformed into condensation products of higher molecular weight. The sulfonates of all the abovementioned diazo compounds, and their aldehyde condensation products respectively (which sulfonates are to be prepared by acting upon a diazo compound with a sulfite in a known manner) can also be used. Also useable are the diazo amino compounds obtained from the above named diazo compounds, and their aldehyde condensation products respectively, as reaction products of a treatment with amines under known conditions.

The light sensitive layers can be incorporated with the usual additions in the diazo type process, e. g. with acids or stabilizing salts.

The invention may be illustrated by the following examples:

(1) A 3% aqueous solution of the zinc chloride double salt of the condensation product of 1 mol. diazodiphenylamine and 1 mol. paraformaldehyde is coated on a parchment paper sheet by means of a cotton swab and dried. Writing or a design is applied to the photosensitized foil by means of a lithographic pencil and subsequently the foil is treated with an aqueous solution containing 1% of the sodium salt of phenylmethylpyrazolone sulfonic acid to form an azo dyestuff. Afterwards the foil is exposed to light on its backsurface to produce the base of adhesion for the fatty ink. The prints obtained by means of the foil are unobjectionable.

Other fast coupling compounds can be used instead of phenylmethylpyrazolone sulfonic acid.

(2) An acetyl cellulose foil which has been saponified to a depth of about $12\mu$ and sensitized with a 3% aqueous solution of the sulfonate of the condensation product prepared from the diazo compound of -p-amino-diphenylamine and formaldehyde is provided with an image by means of a typewriter. The foil thus prepared is coated with a 5% aqueous solution of the sodium salt of 1-(4-sulfophenyl)-3-methyl-pyrazolone-5 which couples with the diazo compound, at all places not protected by the characters, to form an azo dyestuff. The foil is dried, exposed to light on its backsurface and can be used as a printing foil in an offset printing machine, to produce positive prints.

This application is a division of our copending application, Serial No. 70,804, filed January 13, 1949 and now abandoned.

After having clearly described our present invention, we claim:

1. A process for making printing foils useful in flat and offset printing, comprising mechanically transferring an image onto a foil having a hydrophilic non-metallic surface which is photo-sensitized by means of a diazo compound of the group consisting of diazo compounds of the general formula $$R—Y—Ar—N_2—X$$

wherein:

R=a member of the group consisting of aryl, aralkyl, higher alkyl and aroyl residues,
Y=a member of the group consisting of O, S, NH, and $NR_1$, $R_1$ standing for alkyl, aralkyl or aryl,
Ar=an aromatic residue, and
X=an equivalent of an anion of an acid, their aldehyde condensation products, the sulfonates and diazo amino compounds of said diazo compounds and their aldehyde condensation products respectively, applying an aqueous solution of an azo component having hydrophilic substituents to the light sensitive surface of the foil and exposing the foil to light.

2. A process, for making printing material from photosensitized material having a hydrophilic, non-metallic surface sensitized with a light sensitive diazo compound which upon exposure to light decomposes into a printing ink receptive substance, comprising the steps of mechanically transferring an image onto the photo-sensitive material, applying an aqueous solution of an azo component having hydrophilic substituents to the light sensitive surface of the material to couple with the diazo compound not covered by said mechanically transferred image and form a hydrophilic azo dyestuff and exposing the material to light to decompose the diazo compound covered by said mechanically transferred image into a hydrophobic printing ink receptive substance.

3. A process for making printing material from photosensitized material sensitized with a light sensitive diazo compound which upon exposure to light decomposes into a printing ink receptive substance, comprising the steps of mechanically transferring an image onto the photosensitive material, applying an aqueous solution of an azo coupling component of the pyrazolone series of high coupling energy containing hydrophilic groups to the light sensitive surface of the material to couple with the diazo compound not covered by said mechanically transferred image and form a hydrophilic azo dyestuff and exposing the material to light to decompose the diazo compound covered by said mechanically transferred image into a hydrophobic printing ink receptive substance.

4. A process for making printing material from photosensitized material sensitized with a light sensitive diazo compound which upon exposure to light decomposes into a printing ink receptive substance, comprising the steps of mechanically transferring an image onto the photosensitive material, applying an aqueous solution of a sulfonated phenylmethylpyrazolone to the light sensitive surface of the material to couple with the diazo compound not covered by said mechanically transferred image and form a hydrophilic azo dyestuff and exposing the material to light to decompose the diazo compound covered by said mechanically transferred image into a hydrophobic printing ink receptive substance.

5. A process for making printing material from photosensitized material sensitized with a light sensitive diazo compound which upon exposure to light decomposes into a printing ink receptive substance, comprising the steps of mechanically transferring an image onto the photosensitive material, applying an aqueous solution of a sodium salt of a phenylmethylpyrazolone sulfonic acid to the light sensitive surface of the material to couple with the diazo compound not covered by said mechanically transferred image and form a hydrophilic azo dyestuff and exposing the material to light to decompose the diazo compound covered by said mechanically transferred image into a hydrophobic printing ink receptive substance.

6. A process for making printing material from photosensitized material sensitized with a light sensitive diazo compound which upon exposure to light decomposes into a printing ink receptive substance, comprising the steps of mechanically transferring an image onto the photosensitive material, applying an aqueous solution of the sodium salt of 1-(4-sulfophenyl)-3-methyl-pyrazolone-5 to the light sensitive surface of the material to couple with the diazo compound not covered by said mechanically transferred image and form a hydrophilic azo dyestuff and exposing the material to light to decompose the diazo compound covered by said mechanically transferred image into a hydrophobic printing ink receptive substance.

No references cited.